July 28, 1970 T. S. GILLIS, JR 3,521,852
THROTTLE AND SHUTOFF VALVE
Filed Dec. 12, 1966 2 Sheets-Sheet 1
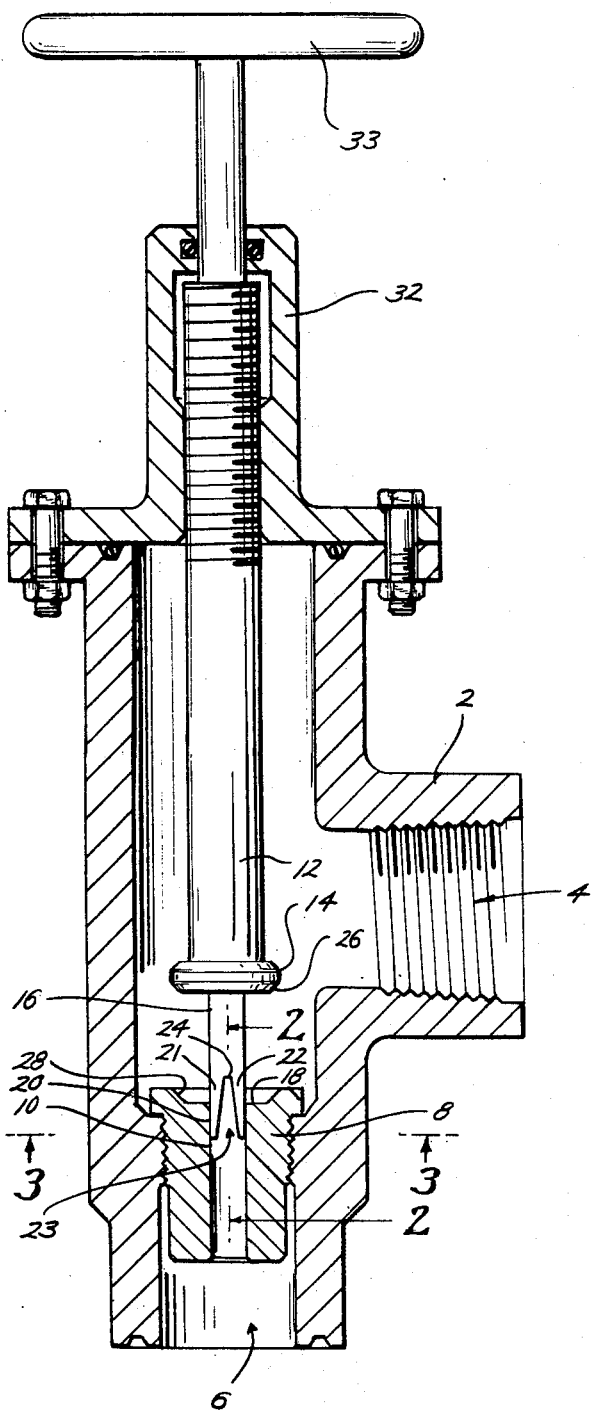
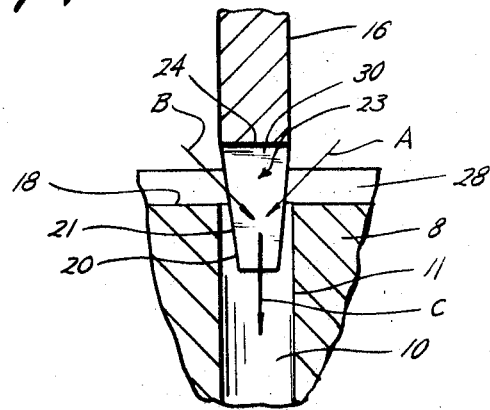
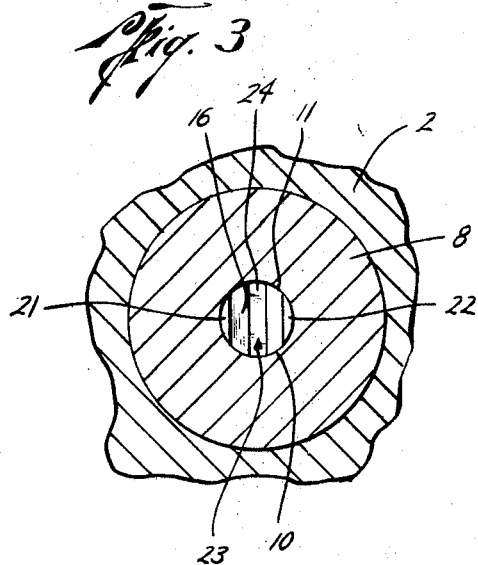
Thomas S. Gillis, Jr.
INVENTOR.
BY
Arnold & Roylance
ATTORNEYS

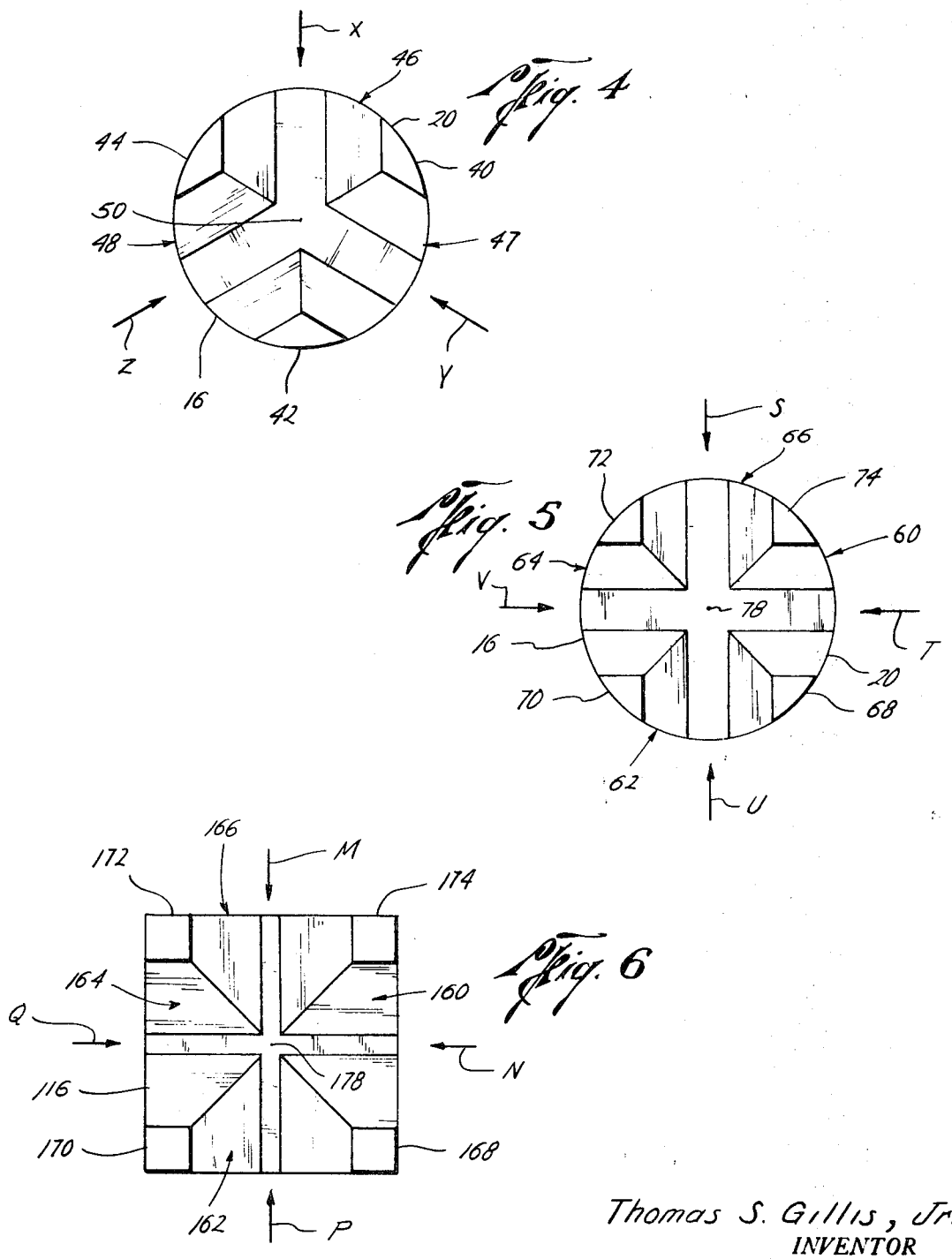

United States Patent Office 3,521,852
Patented July 28, 1970

3,521,852
THROTTLE AND SHUTOFF VALVE
Thomas S. Gillis, Jr., P.O. Box 7907,
Houston, Tex. 77007
Filed Dec. 12, 1966, Ser. No. 600,848
Int. Cl. F16k 47/08
U.S. Cl. 251—121                                    7 Claims

ABSTRACT OF THE DISCLOSURE

Improved apparatus is provided for controlling high velocity fluid flows. An improved throttling plunger is provided which is adapted to form the fluid into two or more streams which are directed away from the wall of the throttling passageway into convergence to form a single stream located coaxially in the passageway.

---

This invention relates to apparatus for continuously controlling and periodically interrupting the flow of fluid under high pressure, and more particularly relates to apparatus for throttling and interrupting the flow of an abrasive fluid.

There are many instances where the flow of abrasive fluid, i.e., liquids or gases containing suspended particles of hard, insoluble material, must be continually controlled and periodically interrupted. For example, it is well known that oil and gas flowing directly to the surface from subterranean rock or earth formations will contain a large amount of sand or other particles. Although these sand particles are small, they are usually composed of quartzite or other similar material, and thus are relatively quite hard and abrasive.

It is also well known that gas and crude oil often flow to the surface under hundreds of pounds of wellhead pressure. The velocity of the fluid flowing past the sealing or shutoff surfaces in the valve will be at a maximum when the valve shutoff surfaces are in their closest proximity just prior to shutoff, and just after opening. Consequently, the sealing surfaces in the valve tend to become severely scored and eroded as the valve is opened and closed. For this reason, conventional valves can be opened and closed only a relatively few times, before the sealing surfaces of the valve are rendered completely incapable of providing complete shutoff of all fluid flow under pressures which are commonly encountered in the oil and gas industry. Moreover, these valves are commonly heavy duty valves built to operate under very high pressures, and thus they are expensive to repair or replace.

It is obviously inconvenient as well as expensive to remove a valve from a high pressure line, and thus many attempts have been made to provide valves of this type which would have a longer useful life. For example, in U.S. Pat. No. 1,970,726, which issued Aug. 21, 1934, to J. M. Barrett, there is disclosed a valve having throttling components as well as shutoff components, whereby fluid flow is first throttled down to a minimum at a point downstream from the shutoff surfaces before the shutoff surfaces are brought closer together. Thus, the velocity of the fluid flowing across the shutoff surfaces is kept to a minimum while the shutoff surfaces are moved together to completely interrupt all flow. Likewise, when the Barrett valve is opened, the throttling components act to keep the velocity of the fluid across the shutoff surfaces at a minimum while the shutoff surfaces are still in close proximity to each other.

For other examples of attempts to provide a shutoff valve having a longer useful life, see U.S. Pat. No. 1,588,645; No. 2,014,314; No. 2,685,294; No. 2,866,477; No. 3,033,323; No. 3,125,122; and No. 3,145,010, which disclose variations and modifications of the valve depicted in Barrett No. 1,970,726.

There is no doubt that valves of the type generally depicted in the aforementioned Barrett patent are better than simple stop-cocks or shutoff valves for interrupting the flow of abrasive fluids, since these valves are now in wide use in the oil and gas industry. However, it should be noted that the abrasion problem has not actually been solved with Barrett-type valves, since the abrasion problem has merely been partially transferred from the shutoff surfaces to the throttling surfaces. Thus, the throttling surfaces, which are also quickly scored and abraded by the particles in the fluid, are usually worn completely away within a relatively short time.

The primary advantage obtained with a Barrett-type valve, is that such valves have a somewhat longer useful life than do simple shutoff valves. Moreover, a Barrett-type valve is usually substantially cheaper to repair, since the throttling surfaces are not required to engage in a completely fluid-tight manner, and since they consequently may be made of materials which are cheaper than the materials used to make the shutoff components. In addition, the shutoff surfaces in the Barrett-type valve will be relatively free from abrasion as long as the throttling surfaces achieve substantial throttling of the fluid flow through the valve. When at least one of the throttling surfaces becomes worn to the extent that effective throttling cannot be obtained, then the shutoff surfaces will necessarily perform such throttling when and as they move together. Consequently, the abrasive particles in the fluid will again be accelerated across the shutoff surfaces, and thus the shutoff surfaces will become scored and abraded just as if no throttling components had ever been included in the valve.

These disadvantages of the prior art are overcome with the present invention, and apparatus is provided herewith for controlling and interrupting a high-pressure flow of an abrasive fluid. In particular apparatus is provided for throttling such fluid in a manner to direct the fluid stream flowing to the throttling passageway into either two or four partially opposing streams which converge into a single resulting stream having generally a single force vector generally coaxial to the throttling passageway. This effectively minimizes damage to the surfaces of the throttling passageway by causing the abrasive particles to flow generally parallel to, rather than obliquely against, such surfaces. Moreover, novel apparatus is provided herein for further prolonging the effective lifetime of the throttling components of a combination shutoff and throttling valve, and thereby to substantially prolong the usefulness of the valve.

These and other features and advantages of the present invention will become apparent in the following detailed description wherein reference is made to the figures in the accompanying drawings. In the drawings:

FIG. 1 is a pictorial representation, partly in cross section, of a combination throttling and shutoff valve embodying one form of the present invention.

FIG. 2 is a pictorial representation, partly in cross section, of a portion of the apparatus depicted in FIG. 1.

FIG. 3 is a pictorial representation in cross section of the throttling passageway and throttling plunger depicted in FIGS. 1 and 2.

FIG. 4 is a pictorial representation of a modification of the throttling plunger depicted in FIGS. 1–3.

FIG. 5 is a pictorial representation of another modification of the throttling plunger depicted in FIGS. 1–3.

FIG. 6 is a pictorial representation of a modification of the throttling plunger depicted in FIG. 5.

Referring now to FIG. 1, there may be seen a pictorial representation of an illustrative embodiment of a valve assembly suitable for both throttling and interrupting the flow of an abrasive fluid. In particular, FIG. 1 shows a T-shaped hollow valve body or case 2 having an inlet port 4 located in the end of one leg, and having an outlet port 6 located in the end of another leg. The inner surface of the inlet port 4 may be threaded, as depicted in FIG. 1, or formed or shaped in any manner for attachment to a pipe or other conventional fluid conduit (not depicted).

A hollow valve seat insert 8, having a narrow cylindrical aperture or throttling passageway 10 along its axis, is threadably inserted in the valve body 2, adjacent the outlet port 6, so as to conduct fluid from the inlet port 4 to the outlet port 6. A valve stem 12, having a shutoff member 14 and a cylindrically-shaped throttling plunger 16, is shown arranged in the hollow valve body 2 so as to be moved axially within the hollow valve seat insert 8 and throttling passageway 10 by any convenient means. As depicted in FIG. 1, the upper end of the stem 12 is threadedly engaged with the valve bonnet 32 and is rotated by means of a wheel 33 to urge the throttling plunger 16 snugly but slidably in and out of the passageway 10, along the entire length of the throttling plunger 16.

The upper end of the hollow valve seat insert 8 is preferably provided with a recessed surface 18 to accommodate or receive the shutoff member 14, upon maximum insertion of the throttling plunger 16 into the passageway 10.

As may be seen in FIGS. 1 and 2, extensions 21 and 22 are partially cylindrical segments resulting from the wedge-shaped cavity 23 cut into the longitudinal axis of the free traveling end 20. Thus the extensions 21 and 22 are narrower at their lower ends, and the converging streams entering the cavity 23 between the extensions 21 and 22 will thus become more restricted or narrowed as the valve stem 12 and throttling plunger 16 move downward.

It should be noted that the converging streams are not cut off until the throttling plunger 16 moves downward far enough to align the apex surface 24 at or below the recessed surface 18 of the hollow valve seat insert 8. At this point, however, fluid does not necessarily completely stop flowing through the passageway 10, but tends, instead, to leak or seep through the annulus between the throttling plunger 16 and the valve seat insert 8 to an extent primarily dependent on the pressure and the viscosity of the fluid. Nevertheless, the velocity of the abrasive particles flowing between the shutoff surfaces 26 and 28 is reduced to a minimum from the instant the apex surface 24 moves below the recessed surface 18. Accordingly, little if any abrading of surfaces 26 and 28 should occur while the shutoff surfaces 26 and 28 are moved into sealing engagement to completely interrupt fluid flow through the valve body 2.

It should be especially noted that the throttling plunger 16 will travel a substantial predetermined distance after maximum throttling is obtained, and before the complete shutoff is achieved. This additional travel of the plunger is hereinafter referred to as "overtravel," and it is a feature of one embodiment of this invention that maximum overtravel be provided within the practical limits of the configuration of the valve body 2.

Referring now to FIG. 2, there is depicted a cross-sectional representation taken along the line 2—2 in FIG. 1 of the throttling plunger 16 showing one throttling plunger extension 21. A portion of the hollow valve seat insert 8 is also depicted in FIG. 2, including the passageway 10, the recessed top surface 18, and the beveled surface of shutoff valve seat 28. The throttling plunger 16 is depicted in cross section, showing the apex surface 24 of the cavity 23, and showing the inside surface 30 of the extension 21 of the throttling plunger 16. As depicted in FIG. 2, the throttling plunger 16 has entered partially into the passageway 10, but the apex surface 24 of cavity 23 is still above the top surface 18 of the hollow seat insert 8. Accordingly, fluid is directed into the passageway 10 substantially along the two routes converging as represented in FIG. 2 by Vectors A and B. Vector C represents the resultant downward force vector of the fluid flow produced by the convergence of the two streams represented by Vectors A and B. It should be noted that the force vectors of the converging streams represented by Vectors A and B are both substantially parallel to the inside surface 30 of extension 21, and to the corresponding inside surface of extension 22 (not depicted in FIG. 2).

The resultant path of the abrasive particles (Vector C) will be directed downward parallel to the walls 11 of passageway 10 and thus away from the outwardly sloping surfaces 30 of extensions 21 and 22. This also tends to reduce the abrading effect had on the inner surfaces of extensions 21 and 22 by the abrasive particles (as compared to abrasion of the throttling surfaces in the prior art valves). In fact, experience has shown that after a valve of the type depicted in FIGS. 1 and 2 has been in use for a relatively long period of time, the streams traveling along Vectors A and B tend to merely "hollow out" the inside surfaces of extensions 21 and 22 in a generally symmetrical manner, and abrasion in this manner will not appreciably affect the throttling capability of such a valve until extensions 21 and 22 are completely eroded from throttling plunger 16.

As hereinbefore stated, the path of the downward stream represented by Vector C is substantially parallel to the inside wall 11 and approximately in the center of passageway 10. Thus, abrasion of wall 11 is kept to an absolute minimum by means of extensions 21 and 22, and cavity 23. Even so, such wear as does inevitably occur after a long period of usage will generally take the form of a concave shaping or hollowing of wall 11 at a point substantially below the surface 18, and the upper mouth of the passageway 10 tends to be enlarged only slightly at the two locations or sections opposite cavity 23. Some erosion of the wall 11 of the passageway 10 cannot be avoided, since streams A and B may not be equal in magnitude and may not be aimed precisely oppositely each other. However, the throttling plunger 16 may be rotated as it is inserted into (or removed from) the passageway 10, and thus any unavoidable erosion of the wall 11 will tend to be uniformly distributed about the upper end of the wall 11 of the passageway 10. Thus, effective throttling is not reduced or otherwise adversely affected, until extensions 21 and 22 are completely eroded away, and even then the remaining portion of the throttling plunger 16 will also block passageway 10.

As hereinbefore stated, it is a feature of the present invention that maximum overtravel of the throttling plunger 16 be provided. This is because effective throttling will be achieved as long as flow through passageway 10 can be reduced to a minimum at a position sufficiently prior to the time surfaces 26 and 28 approach contact. In other words, it is necessary to reduce flow velocity to a minimum by means of throttling and not by means of the shutoff surfaces 26 and 28, and this can only be accomplished by substantially blocking the entrance to passageway 10 before any substantial flow restriction is accomplished by closure of surfaces 26 and 28.

As previously mentioned, the shank of throttling plunger 16 will continue to block passageway 10 even after extensions 21 and 22 are completely eroded away. Thus, the length of time that the throttling plunger 16 can be used to achieve effective throttling after extensions 21 and 22 have been destroyed, is primarily a function of the length of the throttling plunger 16 (above apex surface 24) which can be thrust into the passageway 10. Consequently, the amount of overtravel provided for is also a primary determinant in the useful life of a valve of this type.

It is another feature of the present invention to provide an improved method of throttling the fluid flow through a combination throttling and shutoff valve of the type depicted generally in FIG. 1. More particularly, it should be noted that the top portion of the valve seat insert 8 is adapted to form a first chamber, and that the throttling passageway 10 effectively forms a second chamber. Further it should be noted that the cross-sectional area of this first chamber encompassed by surface 28 is at least twice the cross-sectional area of the second chamber, and is preferably at least four times the cross-sectional area of the second chamber. Accordingly, the first chamber functions as a velocity reduction chamber whereby the velocity of the fluid flowing between surfaces 26 and 28 is greatly reduced when the apex surface 24 passes below surface 18 and full throttling is effected. It is this feature, together with the step of forming the converging streams in the second chamber which effectively increases the useful life of the throttling and shutoff components in the valve, and accordingly greatly lengthens the overall useful life of the valve itself.

Referrfng now to FIG. 3, there may be seen a cross-sectional representation of the throttling passageway 10 in the throttling insert 8, and showing the free traveling end 20 of the throttling plunger 16 depicted in FIGS. 1 and 2, all as taken along line 3—3 in FIG. 1. More particularly, the throttling insert 8 may be seen positioned in the valve body 2, and the throttling plunger 16 is fully depicted to show both extensions 21 and 22 with their tapered inner surfaces and the apex surface 24 forming the cavity 23.

Referring now to FIG. 4, there may be seen a modification of the free traveling end 20 of the throttling plunger 16 depicted in FIGS. 1 and 2, wherein three equally spaced apart extensions 40, 42 and 44 are provided. As represented by Vectors X, Y and Z, fluid flow into the throttling passageway 10 will thus be restricted to three separate streams entering through gaps 46–48 to converge into a single downwardly-directed stream (not represented) at or about the junction 50 of gaps 46–48.

It should be noted that the form of the invention depicted in FIG. 4 is quite suitable, provided the three streams represented by Vectors X, Y, and Z, are substantially equal in magnitude. However, it should also be noted that, in valve apparatus of the type depicted in FIG. 1, these streams are seldom if ever exactly equal in magnitude, and thus if the stream represented by Vector X (for example) is greater than the other two streams, the point of convergence of the three streams will tend to be shifted toward extension 42. In such a case, the particles in stream X will bombard extension 42 to such an extent that extension 42 will tend to be eroded much more rapidly than will the two extensions 21 and 22 depicted in FIG. 1.

Referring now to FIG. 5, there may be seen a further modification of the free traveling end 20, of the throttling plunger 16 depicted in FIGS. 1 and 2, wherein its free traveling end is provided with four equally spaced apart extensions 68, 70, 72 and 74. In this form of the present invention, fluid flow into the throttling passageway 10 will thus be restricted to four equally spaced apart streams represented by Vectors S, T, U, and V, entering through gaps 60, 62, 64 and 76, to converge into a single downwardly-directed stream (not represented) at or about the junction 78 of gaps 60, 62, 64 and 76.

The advantages provided by the form of the invention depicted in FIG. 5, (over that depicted in FIG. 4), will be apparent if it is assumed that the streams represented by Vectors S and U are of dissimilar magnitude. In such a case, the point of convergence of streams S and U will be shifted away from the intersection 78 of gaps 60, 62, 64, and 76, as previously mentioned in the case of FIG. 3. However, this shift will tend to be restricted to the loci of points defined by gaps 60 and 64, depending upon whether the stream represented by Vector S is greater or less than the stream represented by Vector U. Likewise, the point of convergence of the streams represented by Vectors V and T will tend to be shifted along, and only along, gaps 62 and 76, in the event these streams are of dissimilar magnitude.

It should therefore be apparent that there is less tendency for extensions 68, 70, 72 and 74 to be damaged as a result of any dissimilarities in the magnitudes of the four streams represented by Vectors S–V, where the fluid flow through the valve is redirected or split into four separate and independent streams in the manner depicted in FIG. 5. Although the relative point or position of the convergence of streams T and V (for example) is not completely unaffected by the position of the convergence of streams S and U, it should be apparent that it is much less affected than is the position of the convergence of streams Y and Z affected by the position of the convergence of stream X with streams Y and Z, for example.

It will thus be apparent that, in principle, it is a feature of the preferred forms of this invention that the free traveling end 20 of the throttling plunger 16 divide the fluid into an even number of streams, rather than into an uneven number of streams, and that each stream be located 180 degrees from one of the other streams. For valves having small diameter passageways, the number of extensions must preferably be limited to either two or four since the extensions will otherwise be too slender and thus too fragile. On the other hand, if the valve incorporating the present invention has a large diameter throttling passageway (such as two inches or greater), then a greater number of extensions may be provided since it is often preferable to provide for narrow streams.

As hereinbefore stated, it is a feature of the present invention that more suitable materials can be employed in constructing valves of the type depicted in the accompanying drawings. Since the shutoff surfaces 26 and 28 are more adequately protected, abrasion of these surfaces need no longer be considered under ordinary conditions and circumstances. Accordingly, at least one of the shutoff surfaces 26 and 28 may be made of a relatively soft material such as stainless steel, so that fluid flow can be more easily and completely shut off. On the other hand, effective throttling for present purposes does not require absolute shutoff, and thus the throttling plunger 16 and extensions 21 and 22, and the body of the valve seat insert 8 (especially adjacent the passageway 10) may be formed of relatively hard but inexpensive material such as tool steel, boron carbide, tungsten carbide, or even an inexpensive ceramic material.

Although the throtling plunger and throttling passageway, in FIGS. 1–5, are consistently shown to have a round configuration, it should be noted that any configuration may be used with the present invention.

Referring now to FIG. 6, there may be seen a bottom view of the free traveling end of a throttling plunger 116 incorporating the features of the present invention, but also having a rectangular (square) configuration and thus usable in a throttling passageway having a square cross section.

Thus, it may be seen that the free traveling end of the throttling plunger 116 is provided with four equally spaced-apart extensions 168, 170, 172, and 174, which define four equally spaced-apart gaps 160, 162, 164, and 166, through which the fluid may flow in equally spaced-apart streams represented by Vectors M, N, P and Q. Assuming these streams to be substantially equal in magnitude, they will tend to converge at or about junction 178 to produce the same resulting stream (not represented in FIG. 6) which is produced with the embodiments hereinbefore described.

It should be noted that the throttling plunger 116 depicted in FIG. 6 is functionally the same as the throttling plunger 16 depicted in FIG. 5, except that a rectangular member cannot be expected to rotate in the throttling passageway to evenly distribute the abrading effect of the downward fluid stream. Accordingly, the throttling plunger 116 must be pivotally connected to the rotatable valve stem 12 depicted in FIG. 1, or else some other conventional driving means must be used to actuate the throttling plunger 116 in FIG. 6.

Other modifications and variations will be apparent from an understanding of the foregoing. Accordingly, the forms of the invention described above and depicted in the drawings, are intended to be illustrative only, and are not intended as limitations of the present invention.

What is claimed is:

1. A combination throttling and shutoff valve comprising:
   a hollow valve body having an inlet port and an outlet port and having a shutoff seat portion and a throttling passageway for conducting fluid in said valve body between said shutoff seat portion and said outlet port,
   a valve stem movable coaxially and slidably of said throttling passageway and having at one end a throttling plunger adapted to penetrate and thereafter substantially occupy said throttling passageway,
   said throttling plunger further having means for directing fluid flowing into said valve body into a plurality of streams at least partially opposing, one to another, and converging into a single stream having substantially a single resultant force vector generally in and parallel to said throttling passageway when said throttling plunger enters said throttling passageway, and
   closure means arranged on said valve stem for sealing engagement with said shutoff seat portion after said throttling plunger has substantially occupied said throttling passageway.

2. Apparatus as described in claim 1, wherein said means for directing fluid comprises a plurality of spaced apart extensions on said throttling plunger formed to engage said throttling passageway to redirect fluid flowing into said passageway into a corresponding plurality of streams at least partially opposing, one to another, which generally converge into a single stream having substantially a single resultant force vector generally in and parallel to said passageway 3. Apparatus as described in claim 2, wherein said extensions are generally tapered along their length to progressively restrict said streams as said extensions are progressively inserted in said passageway.

4. Apparatus as described in claim 3, wherein said throttling plunger is further provided with a cylindrically-shaped shank portion intermediate of said extensions and said closure means, and wherein said shank portion is adapted and arranged to slidably follow said extensions into said passageway to throttle fluid flow through said hollow valve body and to limit the velocity of said fluid flowing between said closure means and said shutoff seat portion of said valve body.

5. Apparatus as described in claim 4, wherein said shank portion of said throttling plunger enters said passageway before said closure means engages said shutoff portion of said valve body.

6. Apparatus as described in claim 5, wherein the shutoff seat portion of said valve body encloses a cross-sectional area at least twice as great as the cross-sectional area of said throttling passageway.

7. In a combination throttling and shutoff valve comprising:
   a hollow valve body having an inlet port and an outlet port and also having a shutoff seat portion and a throttling passageway for conducting fluid in said valve body between said shutoff seat portion and said outlet port,
   a valve stem movable coaxially of said throttling passageway and having at one end a throttling plunger adapted to penetrate and thereafter substantially occupy said throttling passageway, and
   closure means arranged on said valve stem for sealing engagement with said shutoff seat portion after said throttling plunger has substantially occupied said throttling passageway,
   the improvement in combination therewith
      wherein the free traveling end of said throttling plunger confronting said throttling passageway is provided with a plurality of spaced-apart extensions having outwardly facing surfaces shaped for snugly slidable engagement with the inside surface of said throttling passageway and substantially flat inner surfaces for directing fluid flowing into said valve body into a corresponding plurality of streams at least partially opposing, one to another, and converging therewith into a single stream having substantially a single resultant force vector generally in and parallel to said throttling passageway when said extensions enter said throttling passageway.

References Cited

UNITED STATES PATENTS

| | | | |
|---|---|---|---|
| 608,342 | 8/1898 | McElroy | 251—122 |
| 971,162 | 9/1910 | Winkler | 251—122 X |
| 1,588,645 | 6/1926 | Barrett | 251—121 X |
| 1,777,261 | 9/1930 | Grainger | 251—121 X |
| 3,059,894 | 10/1962 | Knecht et al. | 251—121 |

FOREIGN PATENTS 201,809  8/1923  Great Britain.

WILLIAM I. PRICE, Primary Examiner

L. G. MACHLIN, Assistant Examiner

U.S. Cl. X.R.

251—210